Patented Dec. 4, 1928.

1,694,338

UNITED STATES PATENT OFFICE.

LOUIS GABRIEL PATROUILLEAU, OF PARIS, FRANCE, ASSIGNOR TO SOCIETE ALUMINE ET DERIVES, OF PARIS, FRANCE, A JOINT-STOCK COMPANY ORGANIZED UNDER THE LAWS OF THE REPUBLIC OF FRANCE.

PROCESS FOR THE MANUFACTURE OF ALUMINOUS CEMENTS.

No Drawing. Application filed August 10, 1925, Serial No. 49,456, and in France December 19, 1924.

Experience has shown that the method consisting in melting at a high temperature a mixture of bauxites or of aluminous earths and of lime-stone or of lime, always produces a heterogeneous substance on account of the silica present in the bauxites or aluminous earths, because the affinity of silica $SiO_2$ for lime, at the temperature considered, produces, at first, a vitreous slag consisting of a multiple silicate, without hydraulic characteristics, notably more fusible than the combination of aluminum and calcium aimed at, and, consequently, does not give the desired result.

Applicant has noticed that the metallurgical process for the treatment of metallic silicate, in particular garnierite, (double silicate of nickel and magnesium) process known under the name of sulphurizing fusion, hinders the phenomenon of silicatization mentioned above and could perfectly be applied to the production of melted aluminous cements, in a homogenous state, capable of hardening rapidly and of high resistance.

The present invention has therefore for its object the use of the process of sulphurizing fusion in the manufacture of aluminous cements having as a basis, a mixture of bauxite or aluminous earths, and of lime-stone or lime. The invention consists in adding to this mixture sulphur or compounds of sulphur capable of releasing $SO_2$ which constitutes an obstacle to silicatization, or dissociates this silicatization if already formed. These additions can be effected either in the mixture before introduction into the furnace, or during this introduction, or even during the course of baking.

The present invention finally has for its object, as a new industrial product, aluminous cements obtained by means of the above process.

In the examples cited below for the further understanding of the process, the centesimal compositions are given as indications, but are not given in a limitative way, as they can vary within fairly considerable limits without influencing the result; they tend to form a product having the general formula: $SiO_2$, $2Al_2O_3$, $4CaO$ or: oxy-silico-aluminate of calcium.

Example 1.

The following mixture, either briquetted or not, is baked:

| | Kgrms. |
|---|---|
| Lime-stone $CaCO_3$ | 1,200 |
| Bauxite 60% of $Al_2O_3$ | 1,000 |
| Sulphur | 44 |

Under the influence of the air-blast and heat, the sulphur forms $SO_2$; after complete combustion and fusion, the cast product forms a blackish clinker, brilliant and homogeneous, without any trace of slag.

In furnaces in which air is blown, it is possible, instead of making additions of sulphur, to mix with the air, sulphurous anhydride $SO_2$, or vapours of $SO_3$ which dissociate into $SO_2O$. Finally, it is possible to introduce, with the blast, sulphuretted hydrogen which releases sulphur by combustion, which latter is immediately transformed into sulphurous anhydride.

Example 2.

In the preceding mixture, it is possible to replace the sulphur by a natural or artificial sulphide in a sufficient proportion to give the required quantity of sulphur, taking into account the value of the radical S of this sulphide.

In the case of coal-heated ovens, such as cupolas, water-jackets and the like, the reduction of the metal present in the bauxite (iron) and of the added sulphide forms a metallic mat which, on account of its density, falls to the bottom of the oven and separates from the oxy-silico-aluminate of calcium.

The following is an example of the case wherein a sulphide is added:

| | Kgrms. |
|---|---|
| Bauxite containing 60% of $Al_2O_3$ | 1,500 |
| Lime-stone | 1,800 |
| Martial pyrites containing 50% of sulphur (iron bi-sulphide $FeS_2$) | 140 |

*Example 3.*—It is also possible to introduce in the mixture sulphates capable of liberating their radical $SO_4$ either in the presence of carbon, or simply in the presence of silica, or by mere heating. Such are ferrous or ferric sulphates, crude aluminum sulphate obtained by the action of sulphuric acid on bauxite, or crystallized aluminum sulphate or natural or artificial calcium sulphate. It is known that iron sulphate and aluminum sulphate lose their acid radical and release $SO_2$ and O by mere heating, that calcium sulphate loses this radical by heating, in the presence of silica or carbon.

The particular case of crude or crystallized aluminum sulphate is interesting as it brings with its dissociation, a nascent homogeneous base $Al_2O_3$, which has a great affinity for combining with lime.

The following mixture gives an excellent result:

| | Kgrms. |
|---|---|
| Bauxite containing 60% of $Al_2O_3$ | 1,500 |
| Lime-stone | 1,800 |
| Crude aluminum sulphate | 350 |

Sulphates can be replaced by sulphites or hyposulphites which, under certain conditions, are capable of releasing $SO_2$.

Whatever be the furnaces employed (cupolas, water-jackets, blast furnaces, electric furnaces, reverberatory furnaces) the components can be introduced by successive charges, either roughly mixed, or in a previously crushed, mixed and briquetted state.

In all cases, if the baking has been well conducted, the clinker does not retain any appreciable trace of sulphur or of sulphurous or sulphuric acid. The clinker contains particles of metallic iron derived from the oxides of iron in the bauxite, the said particles capable of being separated magnetically after crushing. It should be noted, however, that there can remain a small amount of oxidized iron in the clinker, which is non-magnetic, but it appears to be chemically combined with the elements of the oxy-silico aluminate of calcium and is no longer an inert or prejudicial body as is magnetic iron.

In accordance with current methods, the clinkers, after fine crushing are put on the market as aluminous cements.

I claim:

1. A process for the manufacture of aluminous cements from a mixture of bauxite and lime, comprising adding to the mixture compounds of sulphur capable of releasing sulphurous anhydride when the mixture is heated and in heating said mixture.

2. A process for the manufacture of aluminous cements comprising mixing bauxite, lime and a compound of sulphur and in heating the mixture.

3. A process for the manufacture of aluminous cements, comprising mixing bauxite, lime and aluminum sulphate and heating the mixture.

4. A process for the manufacture of aluminous cements, comprising mixing bauxite, lime, and compounds of sulphur capable of releasing sulphurous anhydride and heating said mixture in the presence of silica.

5. A process for the manufacture of aluminous cements, comprising mixing bauxite, lime and a sulphate which on dissociation produces a nascent base having great affinity for lime and in heating said mixture.

LOUIS GABRIEL PATROUILLEAU.